(12) United States Patent
Mitterreiter

(10) Patent No.: US 6,799,375 B1
(45) Date of Patent: Oct. 5, 2004

(54) COUPLING ELEMENT AND USE OF THE COUPLING ELEMENT IN A DEVICE FOR MEASURING ANGLES

(75) Inventor: Johann Mitterreiter, Chieming (DE)

(73) Assignee: Dr. Johannes Heidenhain GmbH, Traunrout (DE)

( * ) Notice: Subject to any disclaimer, the term of this patent is extended or adjusted under 35 U.S.C. 154(b) by 0 days.

(21) Appl. No.: 10/019,734

(22) PCT Filed: Jun. 10, 2000

(86) PCT No.: PCT/EP00/05372

§ 371 (c)(1),
(2), (4) Date: Jun. 3, 2002

(87) PCT Pub. No.: WO01/02808

PCT Pub. Date: Jan. 11, 2001

(30) Foreign Application Priority Data

Jul. 1, 1999 (DE) .................................... 299 11 508 U

(51) Int. Cl.$^7$ ................................................. G01D 5/26

(52) U.S. Cl. ...................................... 33/1 PT; 33/572

(58) Field of Search ......................... 33/290, 291, 281, 33/282, 283, 284, 285, 1 PT; 338/162

(56) References Cited

U.S. PATENT DOCUMENTS

| | | |
|---|---|---|
| 2,627,733 A | 2/1953 | Amberg |
| 3,987,645 A | 10/1976 | Koster et al. |
| 5,219,314 A | 6/1993 | Her et al. |
| 5,758,427 A | 6/1998 | Feichtinger et al. |
| 5,771,594 A | 6/1998 | Feichtinger |
| 6,501,367 B2 * | 12/2002 | Fleig et al. .................. 338/162 |
| 2002/0002777 A1 * | 1/2002 | Torr ........................... 33/1 PT |
| 2002/0078761 A1 * | 6/2002 | Meyer ........................ 33/1 PT |

FOREIGN PATENT DOCUMENTS

| | | |
|---|---|---|
| DE | 25 00 832 | 7/1975 |
| DE | 88 12 317.0 | 12/1988 |
| DE | 89 15 109.7 | 4/1990 |
| DE | 197 42 114 | 3/1999 |
| EP | 0 762 081 | 3/1997 |
| EP | 0 762 082 | 3/1997 |

OTHER PUBLICATIONS

English language Abstract of Japanese publication No. 08284971, Patent Abstracts of Japan, published by Japanese Patent Office, 1996, one page.

* cited by examiner

*Primary Examiner*—Diego Gutierrez
*Assistant Examiner*—Amanda J Hoolahan
(74) *Attorney, Agent, or Firm*—Brinks Hofer Gilson & Lione

(57) ABSTRACT

A coupling element for an angle-measuring device for connecting a first component to a second component in a radially resilient, but torsion-proof manner with respect to an axis of rotation. The coupling element including a base and a first bracket rigidly fastened on the base and the first component, wherein the first bracket has a first outer support connection location, a second outer support connection location and an inner support connection location centered in a circumferential direction with respect to the axis of rotation between the first and second outer support connection locations. One of the first outer support connection locations of the first bracket and the inner support connection location of the first bracket forms a connection of the first bracket and the base and the other of the first outer support connection location of the first bracket and the inner support connection location of the first bracket is rigidly connected with the first component. A second bracket is rigidly fastened on the base and on the second component and which extends at a right angle with respect to the first bracket, wherein the second bracket has a first outer support connection location, a second outer support connection location and an inner support connection location centered in a circumferential direction with respect to the axis of rotation between the first and second outer support connection locations of the second bracket. One of the first outer support connection locations of the second bracket and the inner support connection location of the second bracket forms a connection of the second bracket and the base and the other of the first outer support connection location of the second bracket and the inner support connection location of the second bracket is rigidly connected with the second component. Flexural strength of the first bracket in a region along the axis of rotation between the inner support connection location of the first bracket and a connecting line of the first and second outer support connection locations of the first bracket is considerably greater than the flexural strength in a region along a circumferential direction between the inner support connection location of the first bracket and the first and second outer support connection locations of the first bracket. Flexural strength of the second bracket in a region along the axis of rotation between the inner support connection location of the second bracket and a connecting line of the first and second outer support connection locations of the second bracket is considerably greater than the flexural strength in a region along a circumferential direction between the inner support connection location of the second bracket and the first and second outer support connection locations of the second bracket.

46 Claims, 6 Drawing Sheets

COUPLING ELEMENT AND USE OF THE COUPLING ELEMENT IN A DEVICE FOR MEASURING ANGLES

Applicant claims, under 35 U.S.C. §§120 and 365, the benefit of priority of the filing date of Jun. 10, 2000 of a Patent Cooperation Treaty patent application, copy attached, Serial Number PCT/EP00/05372, filed on the aforementioned date, the entire contents of which are incorporated herein by reference, wherein Patent Cooperation Treaty patent application Serial Number PCT/EP00/05372 was not published under PCT Article 21(2) in English.

Applicant claims, under 35 U.S.C. §119, the benefit of priority of the filing date of Jul. 1, 1999 of a German patent application, copy attached, Serial Number 299 11 508.9, filed on the aforementioned date, the entire contents of which are incorporated herein by reference.

BACKGROUND OF THE INVENTION

1. Field of the Invention

The present invention relates to a coupling element for connecting two components in a radially resilient, but torsion-proof manner.

2. Description of the Related Art

For manufacturing such coupling elements in a cost-effective manner, they are made of one piece and shaped from sheet metal, such as described, for example, in DE 89 15 109 U1, EP 0 762 081 A1 and EP 0 762 082 A1. Note that EP 0 762 081 A1 corresponds to U.S. Pat. No. 5,771,594 and EP 0 762 082 A1 corresponds to U.S. Pat. No. 5,758,427, the entire contents of each of which are incorporated herein by reference/These coupling elements include a flat center piece as the base, and of four brackets, formed thereon by bends. The brackets extend perpendicularly in relation to the level of the base, and respectively two brackets are arranged opposite and parallel to each other and form a spring parallelogram for radial compensation. To achieve the function of a spring parallelogram, the brackets extend axially and are formed at one location of the base and can be rigidly connected with one of the two components at another location axially remote from the first. The torsion-proof property is reduced because of this axial remoteness and, in the course of a radial deflection of a spring parallelogram, the base is also unavoidably bent because of the axial linear change of the brackets. In an actual case, the base does not bend symmetrically here because of inhomogeneities in the base, because of which the base introduces an angular twist in the remaining two brackets, which causes a mutual twisting of the two components connected via the coupling element.

SUMMARY AND OBJECTS OF THE INVENTION

It is an object of the present invention to create a coupling element which is compactly and space-savingly constructed and can be produced cost-effectively. Moreover, radial compensation movements of the two components connected by the coupling element should be possible without introducing impermissible mutual twisting between the two components.

This object is attained by a coupling element for an angle-measuring device for connecting a first component to a second component in a radially resilient, but torsion-proof manner with respect to an axis of rotation. The coupling element including a base and a first bracket rigidly fastened on the base and the first component, wherein the first bracket has a first outer support connection location, a second outer support connection location and an inner support connection location centered in a circumferential direction with respect to the axis of rotation between the first and second outer support connection locations. One of the first outer support connection locations of the first bracket and the inner support connection location of the first bracket forms a connection of the first bracket and the base and the other of the first outer support connection location of the first bracket and the inner support connection location of the first bracket is rigidly connected with the first component. A second bracket is rigidly fastened on the base and on the second component and which extends at a right angle with respect to the first bracket, wherein the second bracket has a first outer support connection location, a second outer support connection location and an inner support connection location centered in a circumferential direction with respect to the axis of rotation between the first and second outer support connection locations of the second bracket. One of the first outer support connection locations of the second bracket and the inner support connection location of the second bracket forms a connection of the second bracket and the base and the other of the first outer support connection location of the second bracket and the inner support connection location of the second bracket is rigidly connected with the second component. Flexural strength of the first bracket in a region along the axis of rotation between the inner support connection location of the first bracket and a connecting line of the first and second outer support connection locations of the first bracket is considerably greater than the flexural strength in a region along a circumferential direction between the inner support connection location of the first bracket and the first and second outer support connection locations of the first bracket. Flexural strength of the second bracket in a region along the axis of rotation between the inner support connection location of the second bracket and a connecting line of the first and second outer support connection locations of the second bracket is considerably greater than the flexural strength in a region along a circumferential direction between the inner support connection location of the second bracket and the first and second outer support connection locations of the second bracket.

The present invention furthermore relates to the use of this coupling element in an angle-measuring device.

It is therefore a further object of the present invention to disclose an angle-measuring device, wherein the scanning unit is coupled to the stator of the angle-measuring device in a particularly torsion-proof, but radially resilient manner and, if possible, no measuring errors result from radial compensation movements between the scanning unit and the stator.

This object is attained by an angle-measuring device that includes a scanning unit, a stator and a coupling element connected to the stator and the scanning unit in a torsion-proof, but radially resilient manner with respect to an axis of rotation. The coupling element including a base and a first bracket rigidly fastened on the base and the first component, wherein the first bracket has a first outer support connection location, a second outer support connection location and an inner support connection location centered in a circumferential direction with respect to the axis of rotation between the first and second outer support connection locations. One of the first outer support connection locations of the first bracket and the inner support connection location of the first bracket forms a connection of the first bracket and the base and the other of the first outer support connection location of the first bracket and the inner support connection location of the fist bracket is rigidly connected with the first component. A second bracket is rigidly fastened on the base and on the second component and which extends at a right angle with respect to the first bracket, wherein the second bracket has a first outer support connection location, a second outer support connection location and an inner support connection location centered in a circumferential direction with respect to the axis of rotation between the first and second outer support connection locations of the second bracket. One of the first outer support connection locations of the second bracket and the inner support connection location of the second bracket forms a connection of the second bracket and the base and the other of the first outer support connection location of the second bracket and the inner support connection location of the second bracket is rigidly connected with the second component. Flexural strength of the first bracket in a region along the axis of rotation between the inner support connection location of the first bracket and a connecting line of the first and second outer support connection locations of the first bracket is considerably greater than the flexural strength in a region along a circumferential direction between the inner support connection location of the first bracket and the first and second outer support connection locations of the first bracket. Flexural strength of the second bracket in a region along the axis of rotation between the inner support connection location of the second bracket and a connecting line of the first and second outer support connection locations of the second bracket is considerably greater than the flexural strength in a region along a circumferential direction between the inner support connection location of the second bracket and the first and second outer support connection locations of the second bracket.

Particular advantages of the present invention are recited in the following description of exemplary embodiments.

Exemplary embodiments of the present invention are represented in the drawings.

DESCRIPTION OF THE PREFERRED EMBODIMENT(S) OF THE INVENTION

Figure 1:
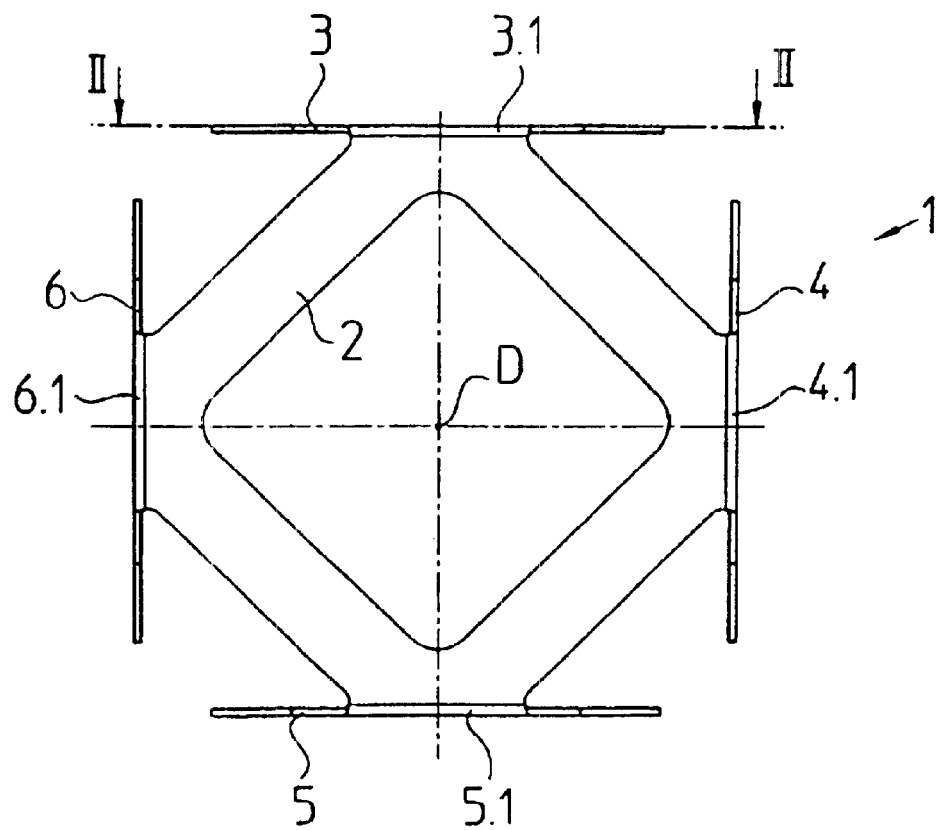
FIG. 1 shows a first exemplary embodiment of a coupling element, viewed in the axial direction according to the present invention.
Figure 2:
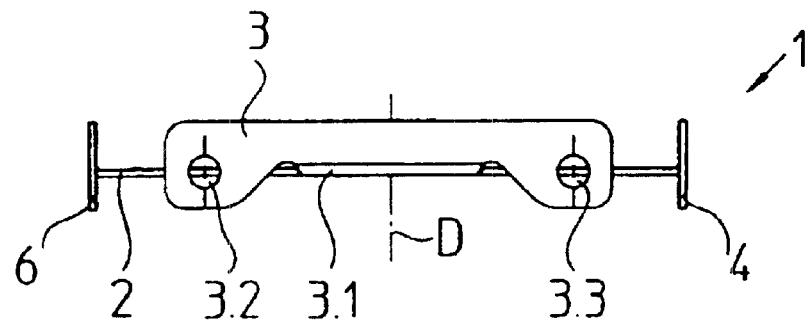
FIG. 2 shows a lateral view of the coupling element in accordance with FIG. 1 taken along line II—II of FIG. 1.
Figure 3:
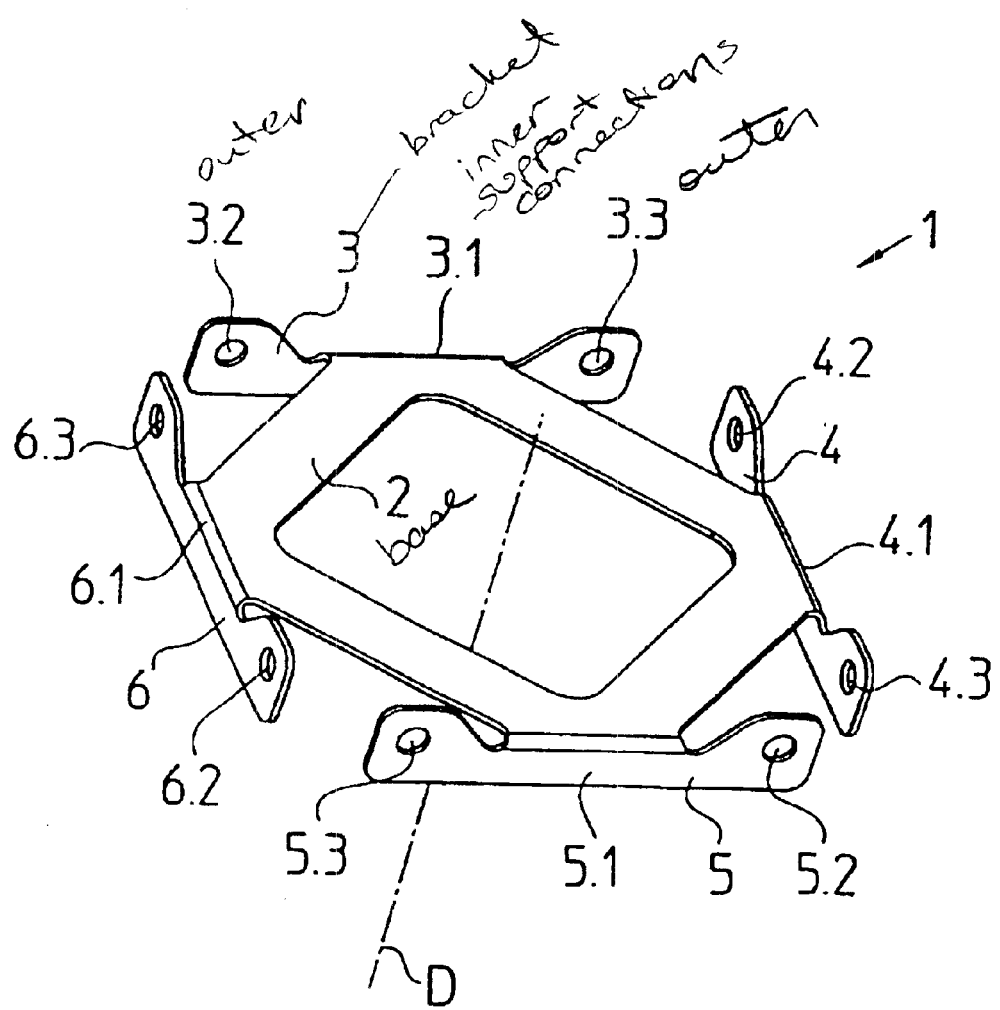
FIG. 3 shows a stereoscopic representation of the coupling element in accordance with FIGS. 1 and 2.

A first exemplary embodiment of a coupling element 1 is represented in FIGS. 1 to 3. The coupling element 1 has been produced in one piece as a punched and bent element and is made of a material with a high degree of alternating stress resistance, in particular of spring steel. It includes a flat center area as the base 2, as well as four brackets 3, 4, 5, 6 formed thereon and bent at right angles. The brackets 3, 4, 5, 6 are aligned, at least to a large degree, parallel in relation to the axis D, they are furthermore arranged diametrically opposite each other and parallel with each other. The bracket 3 is arranged diametrically opposite and parallel with the bracket 5. The bracket 4 is also arranged diametrically opposite and parallel with the bracket 6, wherein the brackets 3 and 5 extend at right angles to the brackets 4 and 6.

Each bracket 3, 4, 5, 6 is fixed, centered atop a support on the base 2, and each bracket 3, 4, 5, 6 has respective further outer support connection locations or points 3.2, 3.3, 4.2, 4.3, 5.2, 5.3, 6.2, 6.3 on both sides of these inner support connection locations or points 3.1, 4.1, 5.1, 6.1. The diametrically oppositely located support points 3.2, 3.3 and 5.2, 5.3 are used for the rigid fastening of the brackets 3, 5 on one of the two components, and the diametrically oppositely located support points 4.2, 4.3 and 6.2, 6.3 are used for the rigid fastening of the brackets 4, 6 on the other of the two components. All support points 3.1 to 6.3 advantageously lie in a common plane that extends at a right angle to an axis of rotation D of a shaft 31 of a rotor 30. The inner support points 3.1, 4.1, 5.1, 6.1 are centered in a circumferential direction with respect to the axis C between corresponding outer support points 3.2, 3.3, 4.2, 4.3, 5.2, 5.2, 6.2, 6.3. The support points 3.1, 4.1, 5.1, 6.1 are formed by bending lines between the base 2 and the brackets 3, 4, 5, 6. The support points 3.2, 3.3, 4.2, 4.3, 5.2, 5.3, 6.2, 6.3 are embodied as bores for fastening by screws, wherein the centers of the bores are located together in the center plane of the base 2. However, other rigid fastening methods, for example welding, can also be provided. The three support points 3.1, 3.2, 3.3, 4.1, 4.2, 4.3, 5.1, 5.2, 5.3, 6.1, 6.2, 6.3 of each bracket 3, 4, 5, 6 are advantageously located on a common straight line, wherein the extensions of the straight lines enclose a rectangular square.

The base 2 advantageously includes four braces, which connect the support points 3.1, 4.1 and 4.1, 5.1 and 5.1, 6.1, as well as 6.1, 3.1 in one plane and enclose a square. In this case the center lines of the braces extend at least approximately in the direction of the lines of application of the force which is introduced at the support points 3.1, 4.1, 5.1, 6.1.

Figure 4:
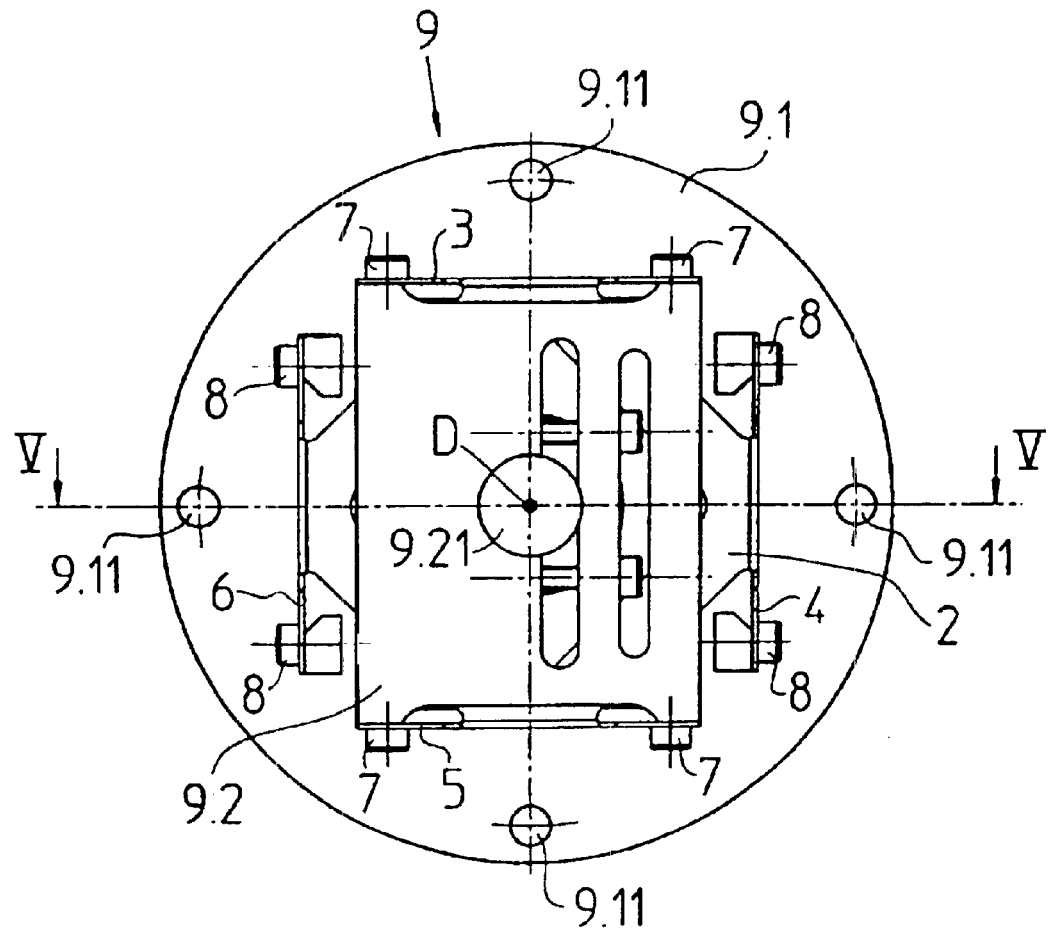
FIG. 4 shows a top view of an embodiment of a shaft adapter with the coupling element of FIGS. 1–3 in accordance with the present invention.
Figure 5:
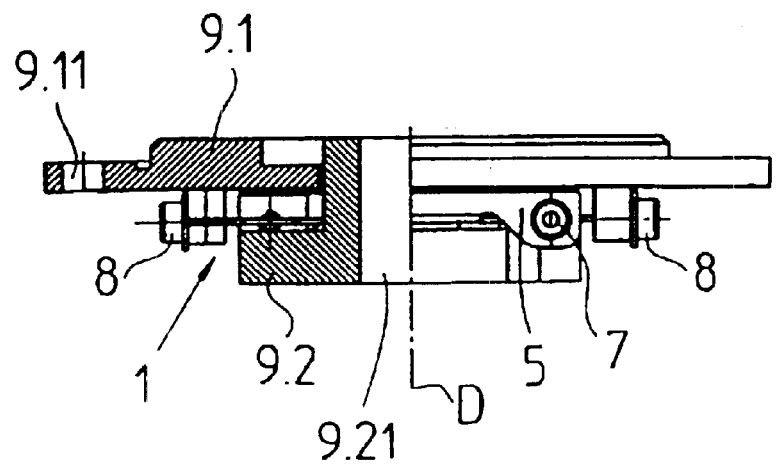
FIG. 5 shows a partial sectional view of the shaft adapter of FIG. 4 taken along lines V—V of FIG. 4 in accordance with FIG. 4.

This described coupling element 1 can be employed in connection with angle-measuring devices in that it is inserted between the shaft of a drive mechanism and the shaft of an angle-measuring device. A shaft adapter 9 with the coupling element 1 in accordance with FIGS. 1 to 3 is represented in FIGS. 4 and 5. The coupling element 1 can be inserted in a particularly simple way between the shaft of the drive mechanism to be measured and the shaft of the angle-measuring device by this shaft adapter 9. The shaft adapter includes a first flange 9.1, on which the shaft of the drive mechanism can be rigidly fastened, and of a second flange 9.2, on which the shaft of the angle-measuring device can be rigidly fastened. In the example represented, the first flange 9.1 is a plate with bores 9.11, so that the plate can be fixed in place on the shaft of the drive mechanism by being screwed together with it. The second flange 9.2 includes a second plate with a centered bore 9.21, in which the shaft of the angle-measuring device can be fixed in place by radial clamping.

The two outer support points 6.2, 6.3 and 4.2, 4.3 of the two diametrically oppositely located brackets 6 and 4 are rigidly connected with the first flange 9.1 by screws 8, and the two outer support points 3.2, 3.3 and 5.2, 5.3 of the brackets 3 and 5 extending at right angles to them are rigidly connected with the second flange 9.2 by screws 7. The two flanges 9.1, 9.2 are connected with each other via the coupling element 1 in a radially and axially resilient, but torsion-proof manner, in relation to the axis of rotation D. For reasons of clarity the support points of the brackets 3 to 5 have not been provided with reference symbols, reference is made with respect to this to FIG. 3. The shafts of the drive mechanism and of the angle-measuring device have also not been represented for reasons of clarity.

In a known manner, the angle-measuring device includes a stationary part, also called mounting flange, of the angle-measuring device, or stator 10 in general, a scanning unit 20 and a rotating element, also called a rotor 30. The rotary position of the rotor 30 with respect to the stator 10 is measured. The rotor 30 in turn includes a shaft 31, which is seated in the scanning unit 20 and on which a code disk 32 is fastened. The scanning unit 20 includes a support body 21, on which a light source 22, a scanning plate 23 and a receiver unit 24 for the photoelectric scanning of the code disk 32 are arranged. The stator 10 can also be the stationary portion of a drive mechanism. For example the mounting flange of a motor, on which the scanning unit is installed.

The shaft 31 of this angle-measuring device can be rigidly installed on a shaft to be measured, because alignment errors are compensated by the coupling element 1, which is integrated into the angle-measuring device. For this purpose, the brackets 4 and 6 are rigidly fixed in place on the stator 10 of the angle measuring device via the support points 4.2, 4.3, 6.2, 6.3. Only one of the screws 7 used for this is represented. The brackets 3 and 5 of the coupling element 1 are rigidly fixed in place on the scanning unit 20 by screws 8 via the support points 3.2, 3.3 and 5.2,. 5.3. Because of alignment errors between the shaft to be measured, not represented, and the shaft 32, the scanning unit 20 performs tumbling movements in relation to the stator 10, which are compensated by the coupling element 1 without the scanning unit 20 performing a rotation around the axis of rotation D in the process, If in the course of the rotation of the shaft 31 the scanning unit 20 is displaced in the radial direction R because of alignment errors, the support points 3.2, 3.3 and 5.2, 5.3 of the brackets 3 and 5 are displaced in this direction R with respect to the support points 3.1 and 5.1. Because of the symmetrical arrangement of the support points 3.2, 3.3 with respect to the center support point 3.1, as well as the support points 5.2, 5.3 with respect to the center support point 5.1, this displacement does not introduce a rotating movement into the coupling element 1. The actually occurring displacements are so small that they are compensated by the symmetrical stretching of the brackets 3 and 5 in the circumferential direction with respect to the axis of rotation D between inner support points 3.1, 4.1, 5.1, 6.1 and the outer support points 3.2, 3.3, 4.2, 4.3, 5.2, 5.3, 6.2, 6.3. In connection with displacements of the scanning unit 20 in the radial direction perpendicular to R, the support point 6.1 is radially moved with respect to the support points 6.2 and 6.3, and the support point 4.1 is also radially moved with respect to the support points 4.2 and 4.3. The changes in distance occurring here between the support points 6.2, 6.1, 6.3 of the bracket 6, and between the support points 4.2, 4.1, 4.3 of the bracket 4, are again compensated by the symmetrical stretching in the brackets 6,4.

If the scanning unit 20 is also displaced in the axial direction because of tumbling movements of the shaft 31, this movement is compensated by the base 2 The angle-measuring device can be an incremental angle encoder—preferably of the photoelectric type—, an absolute value encoder or a resolver.

It has been shown that the transfer behavior of this coupling element 1 is improved in comparison with known couplings, along with cost-effective manufacture and space-saving installation options. The coupling element 1 has a high vibration resistance because of the low mass, very good angular transfer accuracy and good thermal behavior. It can be cost-effectively produced and installed as a punched and bent element and is insensitive to fluctuations in the thickness of the material and strength in the area of the four center connecting braces, because these always remain flat during a radial deflection of the coupling element. It is therefore also possible to easily optimize the radial and axial stiffness independently of each other by varying the sheet metal thickness, or by the application of stiffening bends, for example in the form of beads or by crimping of the base 2.

Figure 7:
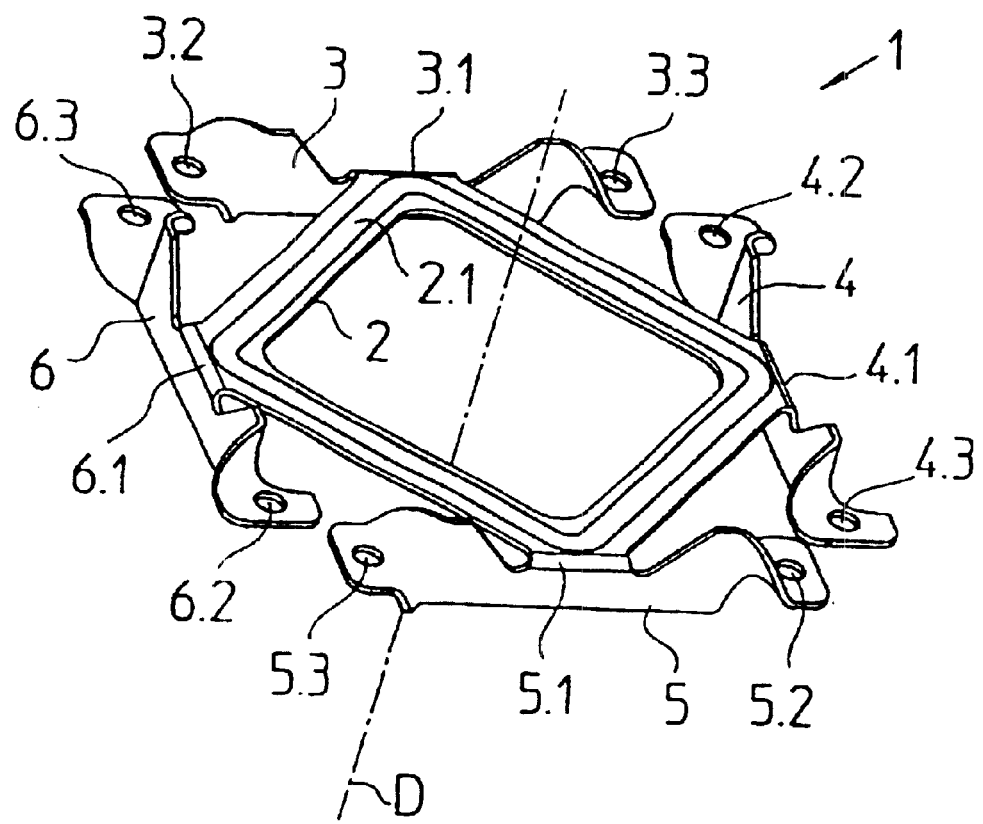
FIG. 7 shows a second exemplary embodiment of a coupling element in accordance with the present invention.

A second exemplary embodiment of a coupling element 1 is represented in FIG. 7. Since it essentially corresponds to the first exemplary embodiment, the same reference symbols are used and the description is limited to the differences. If particularly strong axial stiffness is demanded, the base 2 can be mechanically reinforced by the application of beads 2.1. If an axial fastening of the sheet metal brackets 3, 4, 5, 6, which are bent at right angles in relation to the base, is demanded, the ends with the support points 3.2, 3.3, 4.2, 4.3, 5.2, 5.3, 6.2, 6.3 can be bent over into the plane of the base 2. All support points 3.1 to 6.3 (centers of the fastening points) again lie in a common plane.

Figure 6:
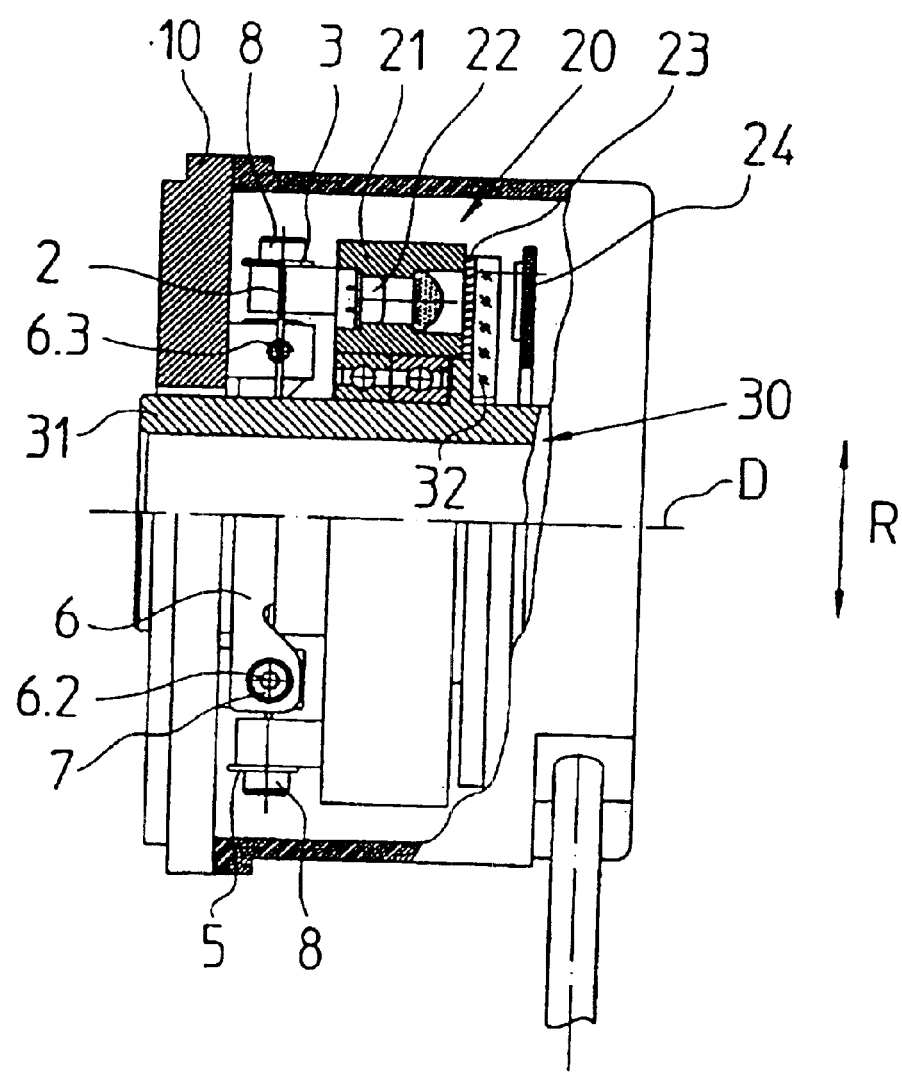
FIG. 6 shows an embodiment of an angle-measuring device with the coupling element in accordance with the present invention.
Figure 8:
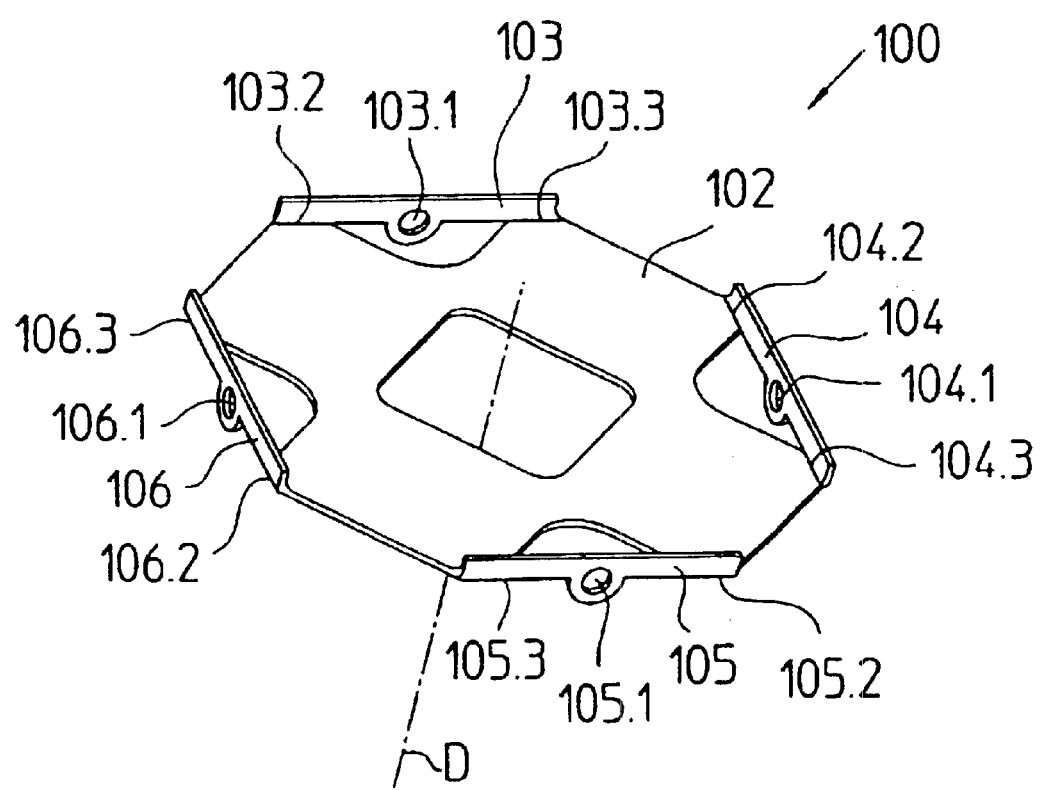
FIG. 8 shows a stereoscopic representational view of a third exemplary embodiment of a coupling element in accordance with the present invention.

The further exemplary embodiment in accordance with FIG. 8 shows a coupling unit 100, wherein the brackets 103 to 106 are formed on the base 102 by their ends being bent at right angles, wherein the support points 103.2, 103.3, 104.2, 104.3, 105.2, 105.3, 106.2, 106.3, which are formed by the bending lines, are located in a common plane, in which the further support points 103.1, 104.1, 105.1, 106.1, which are symmetrically arranged between these support points 103.2 to 106.3, also lie. The center support points 103.1, 105.1 of the brackets 103, 105, which are located parallel across from each other, are used for fastening on one component (for example the first flange 9.1 in accordance with FIG. 4, or the stator 10 in accordance with FIG. 6), and the center support points 104.1, 106.1 of the further brackets 104, 106, which are located parallel across from each other, are used for fastening on the further two components (for example the second flange 9.2 in accordance with FIG. 4, or the scanning unit 20 in accordance with FIG. 6).

In a manner not represented it is also possible to arbitrarily combine the details of the coupling elements 1, 100, represented in FIGS. 3, 7 and 8, for example, a coupling element can have two brackets 3, 5 in accordance with FIG. 3, and two oppositely located brackets 104, 106 in accordance with FIG. 8, which are arranged perpendicularly to the first.

The described coupling elements 1 and 100 have optimal dimensions, if all support points (3.1 to 6.3, 103.1 to 106.3) are located on a common straight line, and if furthermore all support points (3.1 to 6.3, 103.1 to 106.3) of all brackets (3, 4, 5, 6, 103, 104, 105, 106) are located in a common plane. For reasons of the available fastening opportunities it may be necessary to arrange the center support points slightly axially offset (parallel with the axis D) with respect to the further support points. The effect in accordance with the present invention of the coupling element is preserved, if the flexural strength of the brackets 3, 4, 5, 6 between the respective center support points 3.1, 4.1, 5.1, 6.1 and the connecting line with the further support points 3.2, 3.3, 4.2, 4.3, 5.2, 5.3, 6.2, 6.3 (course of the brackets in the axial direction, also parallel with axis D), is considerably greater than the flexural strength between the center support points 3.1, 4.1, 5.1, 6.1 and the two further support points 3.2, 3.3, 4.2, 4.3, 5.2, 5.3, 6.2, 6.3 (course of the brackets in the circumferential direction, i.e. transversely to the axis D), so that in case of a radial displacement of the further support points with respect to the center support point, the brackets are respectively bent between the two further (outer) support points and are therefore stretched.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A coupling element for an angle-measuring device for connecting a first component to a second component in a radially resilient, but torsion-proof manner with respect to an axis of rotation, comprising:

a base;

a first bracket rigidly fastened on said base and said first component, wherein said first bracket comprises a first outer support connection location, a second outer support connection location and an inner support connection location centered in a circumferential direction with respect to said axis of rotation between said first and second outer support connection locations;

wherein one of said first outer support connection locations of said first bracket and said inner support connection location of said first bracket forms a connection of said first bracket and said base and the other of said first outer support connection location of said first bracket and said inner support connection location of said first bracket is rigidly connected with said first component;

a second bracket rigidly fastened on said base and on said second component and which extends at a right angle with respect to said first bracket, wherein said second bracket comprises a first outer support connection location, a second outer support connection location and an inner support connection location centered in a circumferential direction with respect to said axis of rotation between said first and second outer support connection locations of said second bracket;

said first and second outer support connection locations of said second bracket extending at a right angle with respect to said first bracket;

wherein one of said first outer support connection locations of said second bracket and said inner support connection location of said second bracket forms a connection of said second bracket and said base and the other of said first outer support connection location of said second bracket and said inner support connection location of said second bracket is rigidly connected with said second component;

wherein flexural strength of said first bracket in a region along said axis of rotation between said inner support connection location of said first bracket and a connecting line of said first and second outer support connection locations of said first bracket is considerably greater than the flexural strength in a region along a circumferential direction between said inner support connection location of said first bracket and said first and second outer support connection locations of said first bracket; and wherein flexural strength of said second bracket in a region along said axis of rotation between said inner support connection location of said second bracket and a connecting line of said first and second outer support connection locations of said second bracket is considerably greater than the flexural strength in a region along a circumferential direction between said inner support connection location of said second bracket and said first and second outer support connection locations of said second bracket.

2. The coupling element of claim 1, wherein said inner support connection location of said first bracket forms a connection of said first bracket with said base, and said first and second outer support connection locations of said first bracket are rigidly connected with said first component.

3. The coupling element of claim 2, wherein said inner support connection location of said second bracket forms a connection of said second bracket with said base, and said first and second outer support connection locations of said second bracket are rigidly connected with said second component.

4. The coupling element of claim 3, wherein said first and second outer support connection locations of said second bracket are each a bore.

5. The coupling element of claim 2, wherein said first and second outer support connection locations of said first bracket are each a bore.

6. The coupling element of claim 1, wherein said inner support connection location of said first bracket is rigidly attached to said first component, and said first and second outer support connection locations of said first bracket form a connection of said first bracket and said base.

7. The coupling element of claim 6, wherein said inner support connection location of said second bracket is rigidly attached to said second component, and said first and second outer support connection locations of said second bracket form a connection of said second bracket and said base.

8. The coupling element of claim 7, wherein said inner support connection location of said second bracket is a bore.

9. The coupling element of claim 6, wherein said inner support connection location of said first bracket is a bore.

10. The coupling element of claim 1, wherein said coupling element is formed of a piece of sheet metal shaped in one piece.

11. The coupling element of claim 1, wherein said first and second outer support connection locations of said first and second brackets and said inner support connection locations of said first and second brackets are each located on a common plane that extends at a right angle to said axis of rotation.

12. The coupling element of claim 11, wherein said first bracket is bent at a bending connection location so that said first bracket is bent at 90° with respect to said base, wherein said bending connection is one of said first outer support connection locations of said first bracket or said inner support connection location of said first bracket; and said second bracket is bent at a second bending connection location so that said second bracket is bent at 90° with respect to said base, wherein said second bending connection is one of said first outer support connection locations of said second bracket or said inner support connection location of said second bracket.

13. The coupling element of claim 1, wherein said first bracket is bent at a bending connection location so that said first bracket is bent at 90° with respect to said base, wherein said bending connection is one of said first outer support connection locations of said first bracket or said inner support connection location of said first bracket; and said second bracket is bent at a second bending connection location so that said second bracket is bent at 90° with respect to said base, wherein said second bending connection is one of said first outer support connection locations of said second bracket or said inner support connection location of said second bracket.

14. The coupling element of claim 1, further comprising:
a third bracket rigidly fastened on said first component, wherein said third bracket is arranged opposite to said first bracket and extends parallel with said first bracket, and said first bracket and said third bracket constitute a first pair of brackets; and
a fourth bracket rigidly fastened on said second component, wherein said fourth bracket is arranged opposite to said second bracket and extends parallel with said second bracket, and said second bracket and said fourth bracket constitute a second pair of brackets.

15. The coupling element of claim 14, wherein said first and third brackets are located parallel and opposite each other and are fastened on a first flange of a shaft adapter, and said second and fourth brackets extend perpendicular with respect to said first bracket and are located parallel and opposite each other, are fastened on a second flange of said shaft adapter.

16. The coupling element of claim 15, wherein said first flange is rigidly fastened to a first shaft and said second flange is rigidly fastened to a second shaft.

17. The coupling element of claim 16, wherein at least one of said first and second flanges has a bore for the radial clamping of one of said first and second shafts.

18. The coupling element of claim 17, wherein one of said first and second shafts forms part of an angle-measuring device and said one of said first and second shafts is clamped in said bore.

19. The coupling element of claim 1, wherein said base is axially resilient.

20. The coupling element of claim 19 wherein said base comprises a bend to make said base axial resilient.

21. The coupling element of claim 20, wherein said bend comprises a bead.

22. A coupling element for an angle-measuring device for connecting a first component to a second component in a radially resilient, but torsion-proof manner with respect to an axis of rotation, comprising:
a base;
a first pair of brackets arranged opposite and parallel to one another and are rigidly fastened on said base and said first component, wherein each of said first pair of brackets comprises a first outer support connection location, a second outer support connection location and an inner support connection location centered in a circumferential direction with respect to said axis of rotation between said first and second outer support connection locations, said first and second outer support connection locations of said first pair of brackets and said inner support connection locations of said first pair of brackets are located on a common plane that extends at a right angle with respect to said axis of rotation;
wherein one of either each of said first outer support connection locations of said first pair of brackets and each of said inner support connection locations of said first pair of brackets forms a connection of said first pair of brackets and said base and the other of said each of said first outer support connection locations of said first pair of brackets and each of said inner support connection locations of said first pair of brackets are rigidly connected with said first component;

a second pair of brackets arranged opposite and parallel to one another and rigidly fastened on said base and on said second component and which extends at a right angle with respect to said first pair of brackets, wherein each of said second pair of brackets comprises a first outer support connection location, a second outer support connection location and an inner support connection location centered in a circumferential direction with respect to said axis of rotation between said first and second outer support connection locations of said second pair of brackets, said first and second outer support connection locations of said second pair of brackets and said inner support connection locations of said second pair of brackets are located on said common plane;

said first and second outer support connection locations of said second pair of brackets extending at a right angle with respect to said first pair of brackets; and wherein one of either each of said first outer support connection locations of said second pair of brackets and each of said inner support connection locations of said second pair of brackets forms a connection of said second pair of brackets and said base and the other of said each of said first outer support connection locations of said second pair of brackets and each of said inner support connection locations of said second pair of brackets are rigidly connected with said second component.

23. The coupling element of claim 22, wherein said coupling element is formed of a piece of sheet metal shaped in one piece.

24. The coupling element of claim 22, wherein said first pair of brackets are bent at a first set of bending connection locations so that said first pair of brackets are bent at 90° with respect to said base.

25. The coupling element of claim 24, wherein said second pair of brackets are bent at a second set of bending connection locations so that said second pair of brackets are bent at 90° with respect to said base.

26. An angle measuring device comprising;
a scanning unit;
a stator;
a coupling element connected to said stator and said scanning unit in a torsion-proof, but radially resilient manner with respect to an axis of rotation, wherein said coupling element comprises:
a base;
a first bracket rigidly fastened on said base and said stator, wherein said first bracket comprises a first outer support connection location, a second outer support connection location and an inner support connection location centered in a circumferential direction with respect to said axis of rotation between said first and second outer support connection locations;
wherein one of said first outer support connection locations of said first bracket and said inner support connection location of said first bracket forms a connection of said first bracket and said base and the other of said first outer support connection location of said first bracket and said inner support connection location of said first bracket is rigidly connected with said stator;

a second bracket rigidly fastened on said base and on said scanning unit and which extends at a right angle with respect to said first bracket, wherein said second bracket comprises a first outer support connection location, a second outer support connection location and an inner support connection location centered in a circumferential direction with respect to said axis of rotation between said first and second outer support connection locations of said second bracket;

said first and second outer support connection locations of said second bracket extending at a right angle with respect to said first bracket;

wherein one of said first outer support connection locations of said second bracket and said inner support connection location of said second bracket forms a connection of said second bracket and said base and the other of said first outer support connection location of said second bracket and said inner support connection location of said second bracket is rigidly connected with said scanning unit;

wherein flexural strength of said first bracket in a region along said axis of rotation between said inner support connection location of said first bracket and a connecting line of said first and second outer support connection locations of said first bracket is considerably greater than the flexural strength in a region along a circumferential direction between said inner support connection location of said first bracket and said first and second outer support connection locations of said first bracket; and wherein flexural strength of said second bracket in a region along said axis of rotation between said inner support connection location of said second bracket and a connecting line of said first and second outer support connection locations of said second bracket is considerably greater than the flexural strength in a region along a circumferential direction between said inner support connection location of said second bracket and said first and second outer support connection locations of said second bracket.

27. The angle measuring device of claim 26, wherein said inner support connection location of said first bracket forms a connection of said first bracket with said base, and said first and second outer support connection locations of said first bracket are rigidly connected with said stator.

28. The angle measuring device of claim 27, wherein said first and second outer support connection locations of said first bracket are each a bore.

29. The angle measuring device of claim 26, wherein said inner support connection location of said second bracket forms a connection of said second bracket with said base, and said first and second outer support connection locations of said second bracket are rigidly connected with said scanning unit.

30. The angle measuring device of claim 29, wherein said first and second outer support connection locations of said second bracket are each a bore.

31. The angle measuring device of claim 26, wherein said inner support connection location of said first bracket is rigidly attached to said stator, and said first and second outer support connection locations of said first bracket form a connection of said first bracket and said base.

32. The angle measuring device of claim 31, wherein said inner support connection location of said first bracket is a bore.

33. The angle measuring device of claim, 26, wherein said inner support connection location of said second bracket is rigidly attached to said scanning unit, and said first and second outer support connection locations of said second bracket form a connection of said second bracket and said base.

34. The angle measuring device of claim 33, wherein said inner support connection location of said second bracket is a bore.

35. The angle measuring device of claim 26, wherein said coupling element is formed of a piece of sheet metal shaped in one piece.

36. The angle measuring device of claim 26, wherein said first and second outer support connection locations of said first and second brackets and said inner support connection locations of said first and second brackets are each located on a common plane that extends at a right angle to said axis of rotation.

37. The angle measuring device of claim 36, wherein said first bracket is bent at a bending connection location so that said first bracket is bent at 90° with respect to said base, wherein said bending connection is one of said first outer support connection locations of said first bracket or said inner support connection location of said first bracket; and said second bracket is bent at a second bending connection location so that said second bracket is bent at 90° with respect to said base, wherein said second bending connection is one of said first outer support connection locations of said second bracket or said inner support connection location of said second bracket.

38. The angle measuring device of claim 26, wherein said first bracket is bent at a bending connection location so that said first bracket is bent at 90° with respect to said base, wherein said bending connection is one of said first outer support connection locations of said first bracket or said inner support connection location of said first bracket; and said second bracket is bent at a second bending connection location so that said second bracket is bent at 90° with respect to said base, wherein said second bending connection is one of said first outer support connection locations of said second bracket or said inner support connection location of said second bracket.

39. The angle-measuring device of claim 26, further comprising:

a third bracket rigidly fastened on said stator, wherein said third bracket is arranged opposite to said first bracket and extends parallel with said first bracket and said first bracket and said third bracket constitute a first pair of brackets; and a fourth bracket rigidly fastened on said scanning unit, wherein said fourth bracket is arranged opposite to said second bracket and extends parallel with said second bracket and said second bracket and said fourth bracket constitute a second pair of brackets.

40. The angle measuring device of claim 26, wherein said base is axially resilient.

41. The angle measuring device of claim 40, wherein said base comprises a bend to make said base axial resilient.

42. The angle measuring device of claim 41, wherein said bend comprises a bead.

43. An angle-measuring device comprising:

a scanning unit;

a stator;

a coupling element connected to said stator and said scanning unit in a torsion-proof, but radially resilient manner with respect to an axis of rotation, wherein said coupling element comprises:

a base;

a first pair of brackets arranged opposite and parallel to one another and are rigidly fastened on said base and said stator, wherein each of said first pair of brackets comprises a first outer support connection location, a second outer support connection location and an inner support connection location centered in a circumferential direction with respect to said axis of rotation between said first and second outer support connection locations, said first and second outer support connection locations of said first pair of brackets and said inner support connection locations of said first pair of brackets are located on a common plane that extends at a right angle with respect to said axis of rotation;

wherein one of either each of said first outer support connection locations of said first pair of brackets and each of said inner support connection locations of said first pair of brackets forms a connection of said first pair of brackets and said base and the other of said each of said first outer support connection locations of said first pair of brackets and each of said inner support connection locations of said first pair of brackets are rigidly connected with said stator;

a second pair of brackets arranged opposite and parallel to one another and rigidly fastened on said base and on said scanning unit and which extends at a right angle with respect to said first pair of brackets, wherein each of said second pair of brackets comprises a first outer support connection location, a second outer support connection location and an inner support connection location centered in a circumferential direction with respect to said axis of rotation between said first and second outer support connection locations of said second pair of brackets, said first and second outer support connection locations of said second pair of brackets and said inner support connection locations of said second pair of brackets are located on said common plane;

said first and second outer support connection locations of said second pair of brackets extending at a right angle with respect to said first pair of brackets; and wherein one of either each of said first outer support connection locations of said second pair of brackets and each of said inner support connection locations of said second pair of brackets forms a connection of said second pair of brackets and said base and the other of said each of said first outer support connection locations of said second pair of brackets and each of said inner support connection locations of said second pair of brackets are rigidly connected with said scanning unit.

44. The angle measuring device of claim 43, wherein said coupling element is formed of a piece of sheet metal shaped in one piece.

45. The angle measuring device of claim 43, wherein said first pair of brackets are bent at a first set of bending connection locations so that said first pair of brackets are bent at 90° with respect to said base.

46. The angle measuring device of claim 43, wherein said second pair of brackets are bent at a second set of bending connection locations so that said second pair of brackets are bent at 90° with respect to said base.

* * * * *